US009966206B1

(12) United States Patent
Sastry et al.

(10) Patent No.: US 9,966,206 B1
(45) Date of Patent: May 8, 2018

(54) CIRCUIT BREAKERS WITH INTEGRATED SAFETY, CONTROL, MONITORING, AND PROTECTION FEATURES

(71) Applicant: Google Inc., Mountain View, CA (US)

(72) Inventors: Jyoti Sastry, San Jose, CA (US); Anand Ramesh, Sunnyvale, CA (US); James C. Schmalzried, San Jose, CA (US); Ankit Somani, Sunnyvale, CA (US); Ryan T. Davis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 14/705,526

(22) Filed: May 6, 2015

Related U.S. Application Data

(66) Substitute for application No. 61/989,157, filed on May 6, 2014.

(51) Int. Cl.
| | |
|---|---|
| *H01H 9/16* | (2006.01) |
| *H01H 9/54* | (2006.01) |
| *H02H 1/00* | (2006.01) |
| *G08B 21/18* | (2006.01) |

(52) U.S. Cl.
CPC ............. *H01H 9/54* (2013.01); *G08B 21/185* (2013.01); *H01H 9/16* (2013.01); *H02H 1/0061* (2013.01)

(58) Field of Classification Search
CPC .......... H01H 9/16; H01H 9/54; H02H 1/0061; G08B 21/185
USPC ........................................................ 361/93.4
See application file for complete search history.

(56) References Cited

U.S. PATENT DOCUMENTS

| | | | | |
|---|---|---|---|---|
| 4,758,919 A | * | 7/1988 | Stewart | ................. H02H 7/26 361/114 |
| 5,224,006 A | | 6/1993 | MacKenzie et al. | |
| 5,519,561 A | | 5/1996 | Mrenna et al. | |
| 6,381,109 B1 | * | 4/2002 | Burtin | ................. H02H 7/003 361/20 |

(Continued)

FOREIGN PATENT DOCUMENTS

| | | |
|---|---|---|
| CN | 102694363 | 9/2012 |
| EP | 2367252 | 9/2011 |

OTHER PUBLICATIONS

Eaton Corporation, "Cutler-Hammer, Warning," PUB-49439 REV (5) ECN-SOB-0270, Aug. 16, 2001, 1 page.

(Continued)

*Primary Examiner* — Kevin J Comber
(74) *Attorney, Agent, or Firm* — Fish & Richardson P.C.

(57) ABSTRACT

Methods, systems, and apparatus for circuit breakers with integrated safety, control, monitoring, and protection features. In one aspect, a circuit breaker includes an input and an output, a switch coupled between the input and output, a communications device configured to communicate on a data communications network, and a control system coupled to the switch and the communications device, wherein the control system is configured to perform operations including opening the switch as a consequence of detecting an overcurrent condition in a circuit downstream from the circuit breaker, opening and closing the switch based on one or more instructions received by the communications device from the data communications network, and monitoring the power consumption of the circuit downstream from the circuit breaker.

18 Claims, 14 Drawing Sheets

(56) References Cited

U.S. PATENT DOCUMENTS

| | | | |
|---|---|---|---|
| 6,532,140 | B1 | 3/2003 | McMahon et al. |
| 7,016,174 | B2 | 3/2006 | Dougherty |
| 8,542,021 | B2 | 9/2013 | Scott et al. |
| 8,564,307 | B2 | 10/2013 | Kolker et al. |
| 2003/0204756 | A1* | 10/2003 | Ransom ................ G01D 4/004 713/300 |
| 2007/0055889 | A1 | 3/2007 | Henneberry et al. |
| 2012/0159641 | A1* | 6/2012 | Rossi ..................... G01D 4/004 726/27 |
| 2012/0316698 | A1 | 12/2012 | Daniel |
| 2013/0148249 | A1* | 6/2013 | Schlotterer .......... H01H 71/123 361/115 |
| 2015/0002977 | A1* | 1/2015 | Dupraz ................. H01H 9/542 361/115 |
| 2016/0241017 | A1* | 8/2016 | Schroeder ............ H02H 1/0015 |

OTHER PUBLICATIONS

Powelink AS, "Lighting Control System Catalog," Square D, Groupe Schneider, Sep. 1998, 49 pages.
U.S. Appl. No. 15/487,877, filed Apr. 14, 2017, Sastry et al.

\* cited by examiner

CIRCUIT BREAKERS WITH INTEGRATED SAFETY, CONTROL, MONITORING, AND PROTECTION FEATURES

CROSS-REFERENCE TO RELATED APPLICATIONS

This application claims priority to U.S. Provisional Application Ser. No. 61/989,157, filed May 6, 2014, titled "Circuit Breakers with Integrated Safety, Control, Monitoring, and Protection Features" the entire contents of which are hereby incorporated by reference.

BACKGROUND

This specification relates to circuit breakers.

Circuit breakers in some residential applications are implemented using mechanical breakers with thermal and magnetic detection methods. Those circuit breakers are used to detect circuit faults using short circuit and overload conditions and typically respond in a few alternating current (AC) cycles by tripping and breaking the circuit. In response to changes to residential housing codes in some locations, some circuit breakers are required to detect multiple fault types, e.g., ground faults and arc faults.

SUMMARY

This specification describes circuit breakers that can be remotely controllable and include integrated safety, control, monitoring, and protection features. The circuit breakers can be configured to detect bolted faults using the rate of change of current.

In general, one innovative aspect of the subject matter described in this specification can be embodied in circuit breakers that includes an input and an output, a switch coupled between the input and output, a communications device configured to communicate on a data communications network, and a control system coupled to the switch and the communications device, wherein the control system is configured to perform operations including opening the switch as a consequence of detecting an overcurrent condition in a circuit downstream from the circuit breaker, opening and closing the switch based on one or more instructions received by the communications device from the data communications network, and monitoring the power consumption of the circuit downstream from the circuit breaker.

Particular embodiments of the subject matter described in this specification can be implemented to realize one or more advantages. Circuit breakers with electronic detection of faults and overload conditions can detect and interrupt faults more quickly than some conventional circuit breakers, which can improve safety. Circuit breakers can include integrated safety and monitoring features in a single device, which can allow easier installation and replacement of circuit breakers. The circuit breakers can be installed in an electrical panel to enable branch circuit-level control and monitoring. Circuit breakers can be remotely operated by a data communications network, which can allow use of the circuit breakers for features in addition to safety, e.g., load prioritization and curtailment, and touch free control. Circuit breakers can be used to increase the energy efficiency of an electrical system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
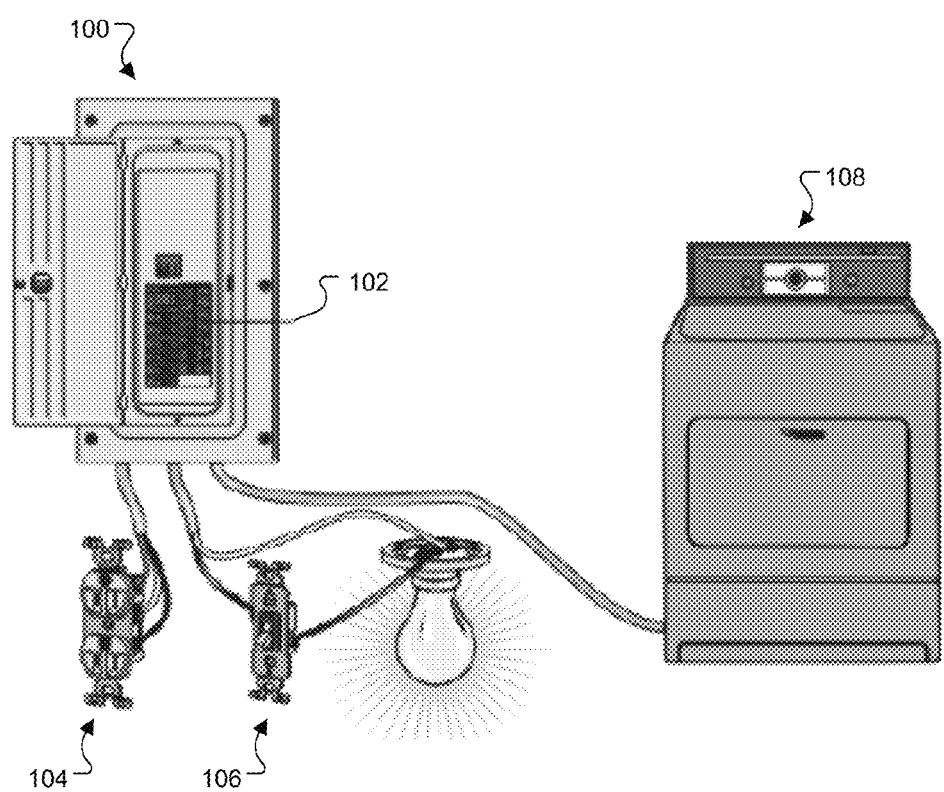
FIG. 1 is a block diagram of an example electrical panel.

FIG. 1 is a block diagram of an example electrical panel 100. The panel can be used to distribute electricity in various electrical systems, e.g., residential electrical systems and light commercial electrical systems.

The panel includes multiple branch circuit breakers 102. A circuit breaker is a device that can energize or de-energize a circuit. Circuit breakers can provide personal and equipment protection by detecting faults and conditions that could otherwise result in electrocutions or fires or both. The example panel of FIG. 1 can include various types of circuit breakers, e.g., circuit breakers as described further below with reference to FIGS. 3-4, 5A-B, 6A-B, and 7.

The panel can be wired in a tree-like structure, where a single breaker, e.g., a main circuit breaker, is used to isolate a residence or other electrical system from a distribution transformer. In some implementations, additional levels of protection are added, e.g., by installing main circuit breakers at additional points, e.g., at the transformer and again at the point of entry at the residence and again at the point of entry at the panel. The main circuit breaker is typically rated to handle high short-circuit interrupting currents.

The panel distributes power to a number of downstream electrical circuits 104, 106, 108. The branch circuit breakers can have a lower short-circuit current rating than the main circuit breaker. In some implementations, the main circuit breaker and the branch circuit breakers are implemented with different time-current ("trip") curves to enable coordinating tripping of breakers within the electrical system. For example, this can enable the tripping of a branch circuit breaker as a first line of protection, thereby isolating only small sections of the circuit, and then later tripping of the main circuit breaker in the event of a failure of operation of the branch circuit breaker.

The main and branch circuit breakers can be configured to use trip curves to confine protection zones within a home at the level of a single large load or multiple small loads, instead of the entire residence. In some jurisdictions, circuit breakers can be subject to legal regulation. For example, some main and branch circuit breakers are subject to the standards set forth by Underwriters Laboratories (UL) 489. In some cases, protection devices downstream of the branch circuit breaker are used. These supplementary protectors can be subject to the standards set forth by UL 1077.

Figure 2A:
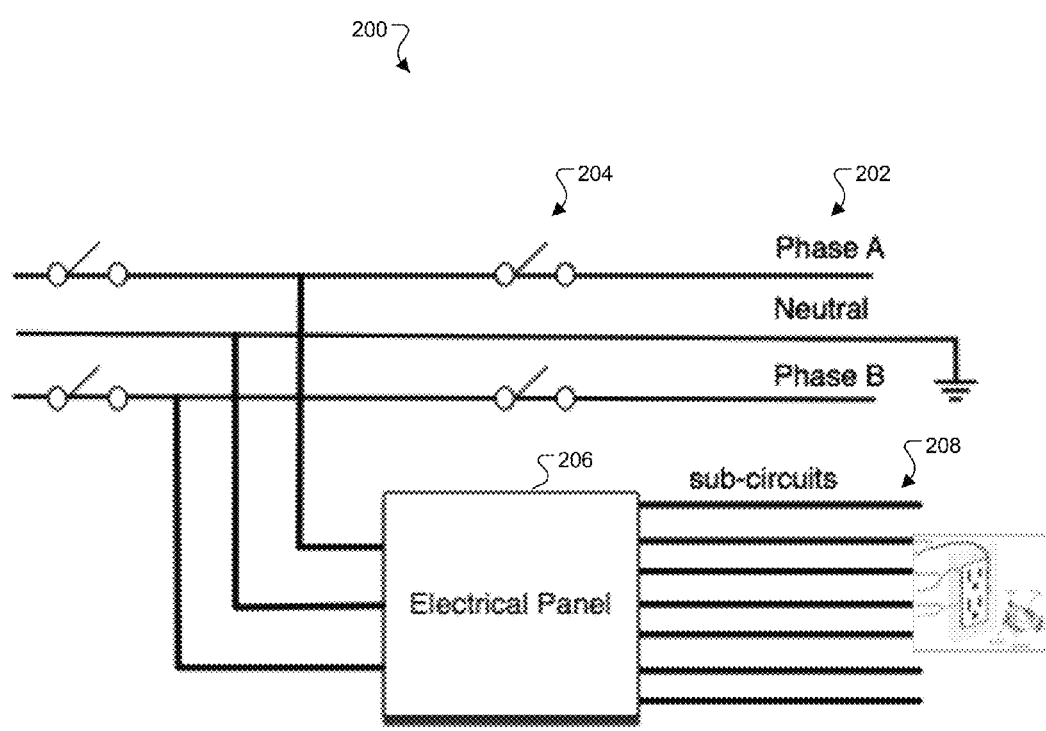
FIG. 2A is a block diagram of an example split-phase electrical system with two phases and a grounded neutral.

FIG. 2A is a block diagram of an example split-phase electrical system 200 with two phases and a grounded neutral. The system receives split-phase power on three electrical connections 202, e.g., from a utility grid. A main circuit breaker 204 is coupled between the source of the split-phase power and an electrical panel 206. The electrical panel includes multiple branch circuit breakers and is configured to distribute power to a number of downstream circuit branches 208.

Figure 2B:
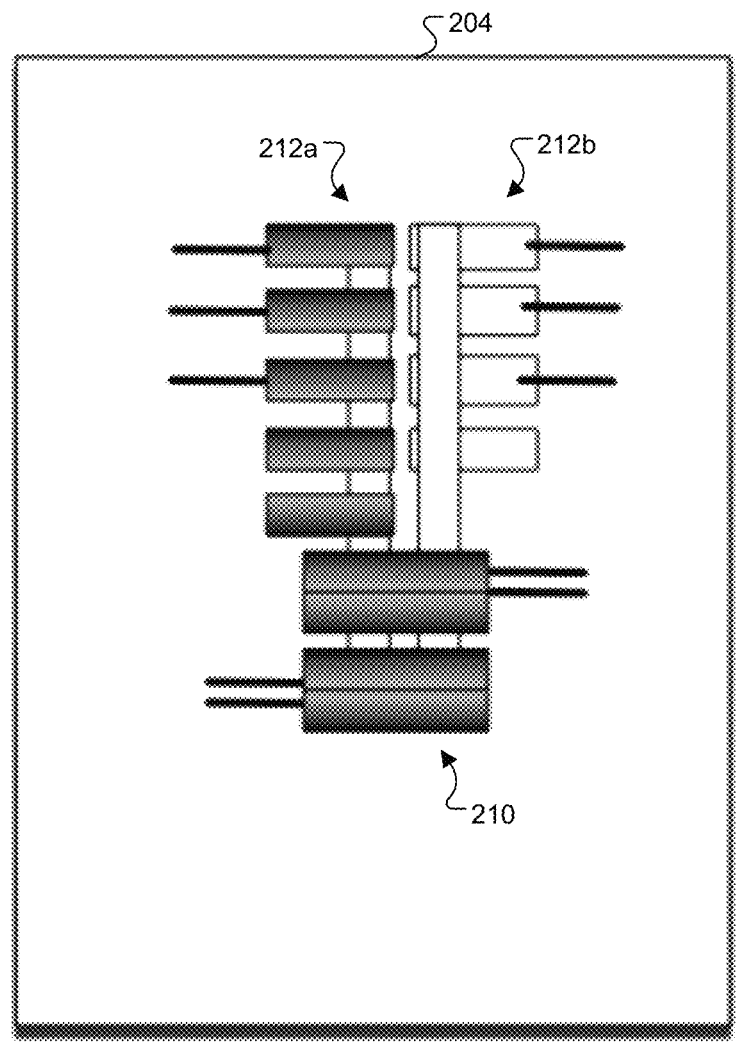
FIG. 2B illustrates the circuit breaker layout of an example electric panel.

FIG. 2B illustrates the circuit breaker layout of an example electric panel 206. One or more source breakers 210 of the panel are coupled to the source of the split-phase power, and each of those breakers is coupled to a respective column of branch circuit breakers 212a-b. The branch circuit breakers are in turn coupled to downstream circuit branches. A source breaker can be a single dual-pole breaker.

The branch circuit breakers 212a-b can be configured to provide one or more of the following features described below. Example circuit breakers configured to implement these features are described further below with reference to FIGS. 3-4.

In some implementations, one or more of the branch circuit breakers is configured for remote operation (e.g., energizing and de-energizing) of individual downstream circuit branches by communicating with a central communications access point, e.g., by wired or wireless communications connections. The central communications access point can be, e.g., a computing device on a network located in the residence, industrial or commercial setting, or a system of one or more computers remote from the residence, industrial or residential setting that is configured to control various independent electrical systems.

In some implementations, one or more branch circuit breakers are configured for monitoring of current or voltage or both of individual downstream circuit branches (e.g., at a sampling frequency of 10 kHz or 20 kHz). Monitoring the power usage of downstream circuit branches can be useful, e.g., in determining areas to reduce energy consumption or increase energy efficiency, in improving electrical safety (e.g., by determining that a certain branch carries unusually high currents), in detection of appliance failures and detection of appliance "type" using signature analysis, in arc fault and ground fault detection, and for creating alerts to a resident for repair or replacement (e.g., using the central communications access point). In some implementations, detection of appliance "type" can further create a map of the electrical distribution of the home. For example, a map can be generated that describes which appliances are on which circuit branches and the current draw of each appliance. Measured power usage values can be stored locally (e.g., at the branch circuit breaker by a microcontroller in the branch circuit breaker) or reported to a remote system, e.g., a central communications access point on the Internet.

The measured power usage values can be used to create a database of electrical signal profiles. The electrical signal profiles can include a record of various electrical signatures (e.g., trended current draw over time, daily profile of power usage, recorded fault situations, etc.) for branch circuits and appliances. In some implementations, the system can use machine learning of the signature analysis to determine when a fault condition will occur. For example, the system learns what the electrical signal (e.g., current draw, voltage level, power consumption, etc.) resembles prior to detection of a fault and preemptively predicts and prevents an upcoming fault condition.

The branch circuit breakers can provide arc-fault circuit interruption (AFCI), e.g., according to legal code standards or industry standards or both. In some implementations, one or more of the branch circuit breakers is configured for ground-fault circuit interruption (GFCI), e.g., according to legal code standards or industry standards or both. The GFCI can be configured for personal safety (e.g., at 6 mA) or equipment safety (e.g., at 30 mA) or both.

In some implementations, one or more branch circuit breakers are configured for using a dynamic trip curve, e.g., enabling adaptation of the circuit breaker to specific loads or combinations of loads. The branch circuit breakers can be configured for enhanced safety by improving the response time for bolted fault detection, e.g., as described further below with reference to FIG. 7.

In some implementations, one or more of the branch circuit breakers is configured with an alert mechanism. For example, the circuit breaker can have an acoustic speaker, and the circuit breaker can play a noise over the speaker when the circuit breaker trips. In another example, the circuit breaker can send a message to a residence computing system or a remote system on the Internet, e.g., a remote system that can send a text message or voicemail to a resident's mobile device to alert the resident that a circuit breaker has tripped.

In some implementations, one or more of the branch circuit breakers is configured to automatically reclose once a fault has been cleared. For example, the circuit breaker can reclose after a certain duration of time after the fault has occurred, and then, if the circuit breaker detects a fault while or after reclosing, the circuit breaker can automatically open. The circuit breaker can be implemented to carry out these actions, e.g., at the direction of a microcontroller.

A branch circuit breaker can be reclosed after a fault has been cleared by communicating with a central communications access point. For example, a resident can reclose the branch circuit breaker using a mobile device that communications with a central communications access point for the panel. The circuit breaker can override remote commands, e.g., by remaining open even after receiving a command to reclose because a fault is detected. Upon detection of the cleared fault, e.g., by receiving an indication of the cleared fault at the central communications access point from the sensors or circuit, the circuit breaker automatically closes the circuit. In some implementations, the circuit breaker reclosing may occur after an extended period of time (e.g., 5 s, 30 s, 60 s, etc.) after the remote command was sent to close the circuit.

In some implementations, the branch circuit breakers are sized to fit within a standard frame size, e.g., so that the branch circuit breakers can replace and/or augment existing circuit breakers in an electrical panel. The branch circuit breakers can be series-rated so that they can be used as series rated devices in an electrical system. Although FIG. 2B illustrates circuit breakers in a single phase or split phase electrical system, the circuit breakers described in this document can be used in any appropriate electrical system, e.g., three phase electrical systems, or direct current (DC) electrical systems.

Figure 2C:
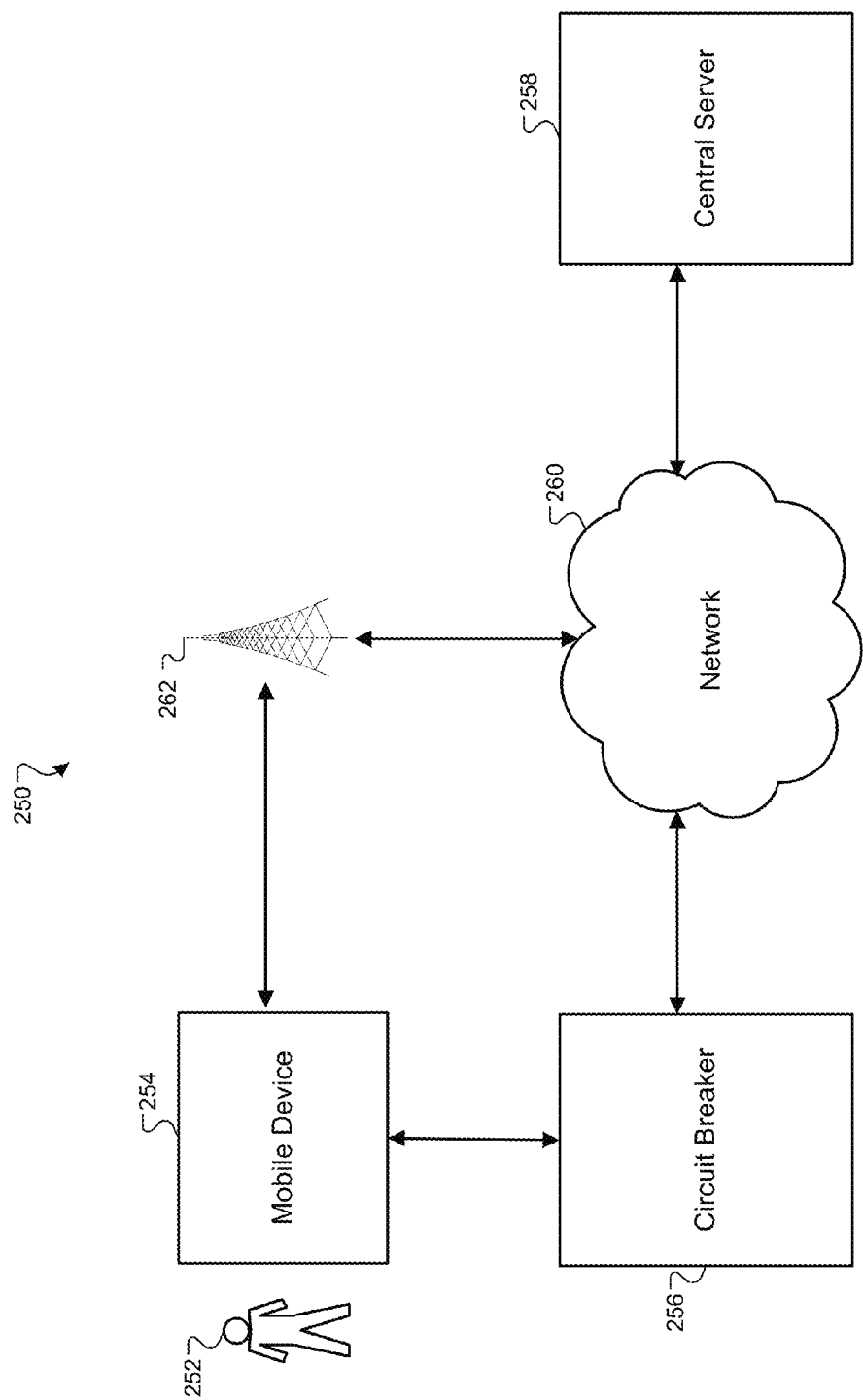
FIG. 2C is a block diagram of an example system for communications with a circuit breaker.

FIG. 2C is a block diagram of an example system 250 for communications with an example circuit breaker 256. A user 252 interacts with a mobile device 254 configured to display a user interface for controlling and/or monitoring the circuit breaker.

The mobile device can communicate directly with the circuit breaker, e.g., using Wi-Fi direct, or indirectly, e.g., using a cellular network 262 connected to a data communications network 260 connected to the circuit breaker, e.g., the Internet. In some implementations, the mobile device communicates with a central server 258 connected to the network, and the central server then communicates with the circuit breaker.

For example, suppose that the central server is configured to host an energy management service for various users. The user establishes an account with the central server and configures the circuit breaker to send monitoring information to the central server. The user can then log in to the account at the central server using the mobile device and view the monitoring information. The user can also log in to the account and remotely trip or reset the circuit breaker.

Figure 3A:
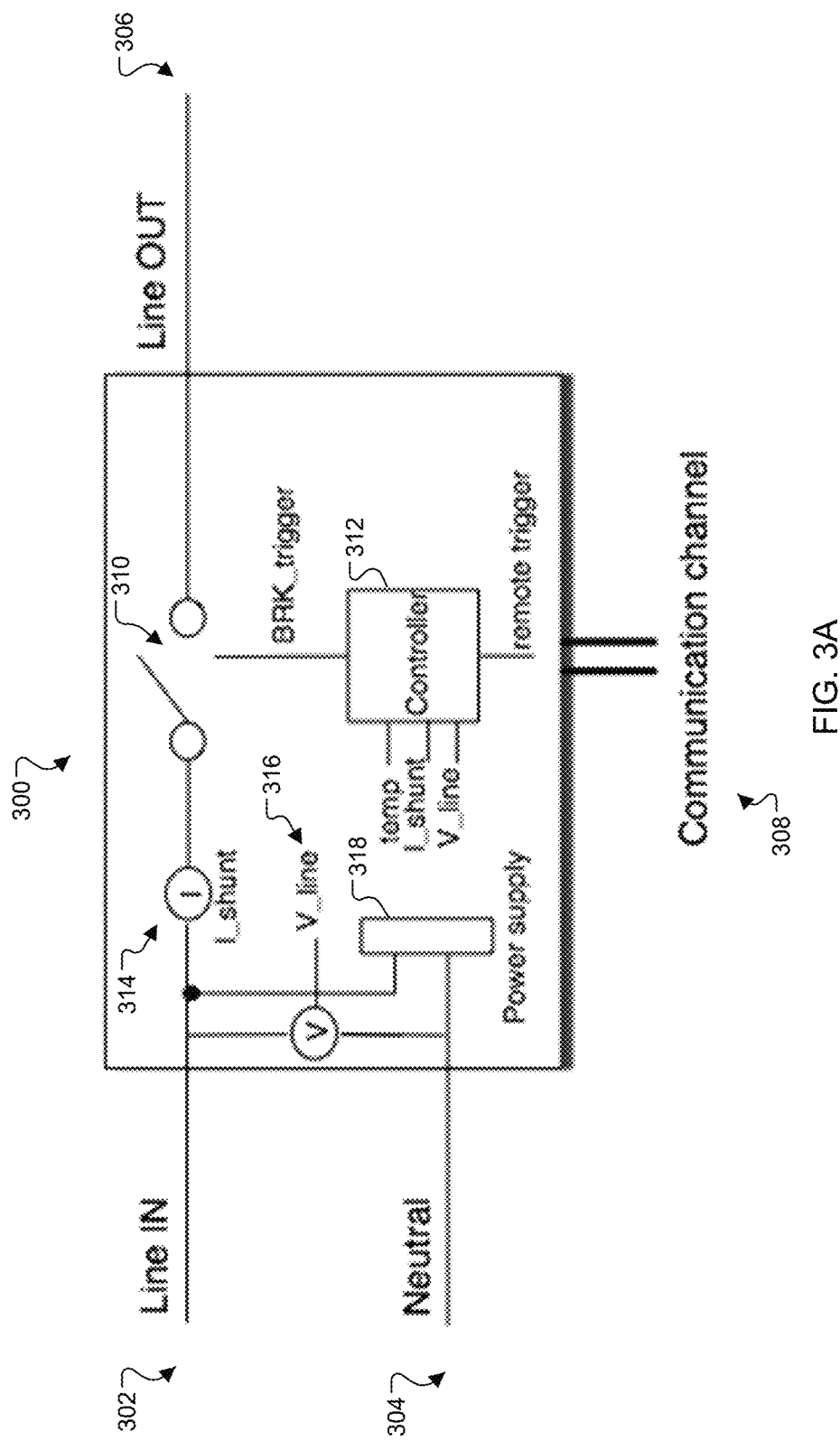
FIG. 3A is a block diagram of an example mechanical circuit breaker with electronic trip detection.

FIG. 3A is a block diagram of an example mechanical circuit breaker 300 with electronic trip detection. The circuit breaker includes inputs for a Line IN 302 and Neutral 304 and an output for a Line OUT 306. The circuit breaker is also connected to a data communications channel 308, e.g., by a wired or wireless communications device.

The circuit breaker includes a mechanical switch 310 to connect or disconnect the Line IN from the Line OUT. The mechanical switch can use conventional thermal and/or magnetic elements for protection in addition to electronic actuation as described below.

The circuit breaker includes a controller 312, e.g., a microcontroller with a combination of software, hardware, and firmware configured to perform various functions, e.g., trip detection, monitoring, reporting, and remote operability. The circuit breaker includes a current monitoring device 314, e.g., an electrical shunt; a voltage monitoring device 316, e.g., a tap between the Line IN and Neutral; and a power supply 318, which can be configured to power the controller or the switch or both.

In operation, the controller receives the measured current, I_shunt; the measured voltage, V_line; and a temperature measurement. Based on one or more of those received measurements, the controller determines whether a fault has occurred on a downstream circuit. For example, the controller can determine that a fault has occurred if the measured current exceeds a threshold current, or if the rate of change of the measured current over time exceeds a threshold rate of change. If the controller determines that a fault has occurred, the controller opens the switch 310 by the BRK_trigger signal, thereby disconnecting the Line IN from the Line OUT.

The controller can also receive a remote trigger signal from the communication channel. The remote trigger can cause the controller to open or the close the switch for reasons other than determining that a fault has occurred on a downstream circuit, e.g., for load curtailment. The remote trigger signal can be from, e.g., a resident using a user device, or from a utility company computer system, or from a master control system for a residence.

In some implementations, the controller sends the measured current or voltage to a remote system using the communications channel. The controller can also store some measurements of the current or voltage on local storage, e.g., a computer readable medium coupled to the controller, so that the measurements can be collected later. For example, a resident may query the controller for the measurements using a user device on a data communications network after the circuit breaker has tripped.

In some implementations, the controller is configured to use a dynamic trip curve to determine when to open the switch. In those implementations, the controller compares a local condition to a dynamic threshold to determine whether or not to open the switch. The local condition can be, e.g., one or more of the measured current, voltage, and temperature values.

The controller determines the threshold dynamically, e.g., based on an instruction from the communication channel, or the time of day, or the load it is connected to, or one or more of the other measurements. For example, the dynamic trip curve can specify a first threshold current for daylight hours and a second threshold current for nighttime hours; the controller then opens the switch when the measured current matches or exceeds the threshold current for the appropriate time of day. Trip curves can be adjusted to match the load connected downstream of the breaker, e.g., so that high inrush loads do not trip the circuit breaker during normal startup.

In some implementations, the controller implements AFCI or GFCI or both using pattern recognition techniques. The controller compares the measured current or voltage or both to arc fault or ground fault signatures, and if the measured values match or are close enough to the signatures, determines that an arc fault or ground fault has occurred on the downstream circuit branch. The controller can implement GFCI for equipment safety, personal safety, or both. GFCI can be implemented using conventional analog detection methods.

Figure 3B:
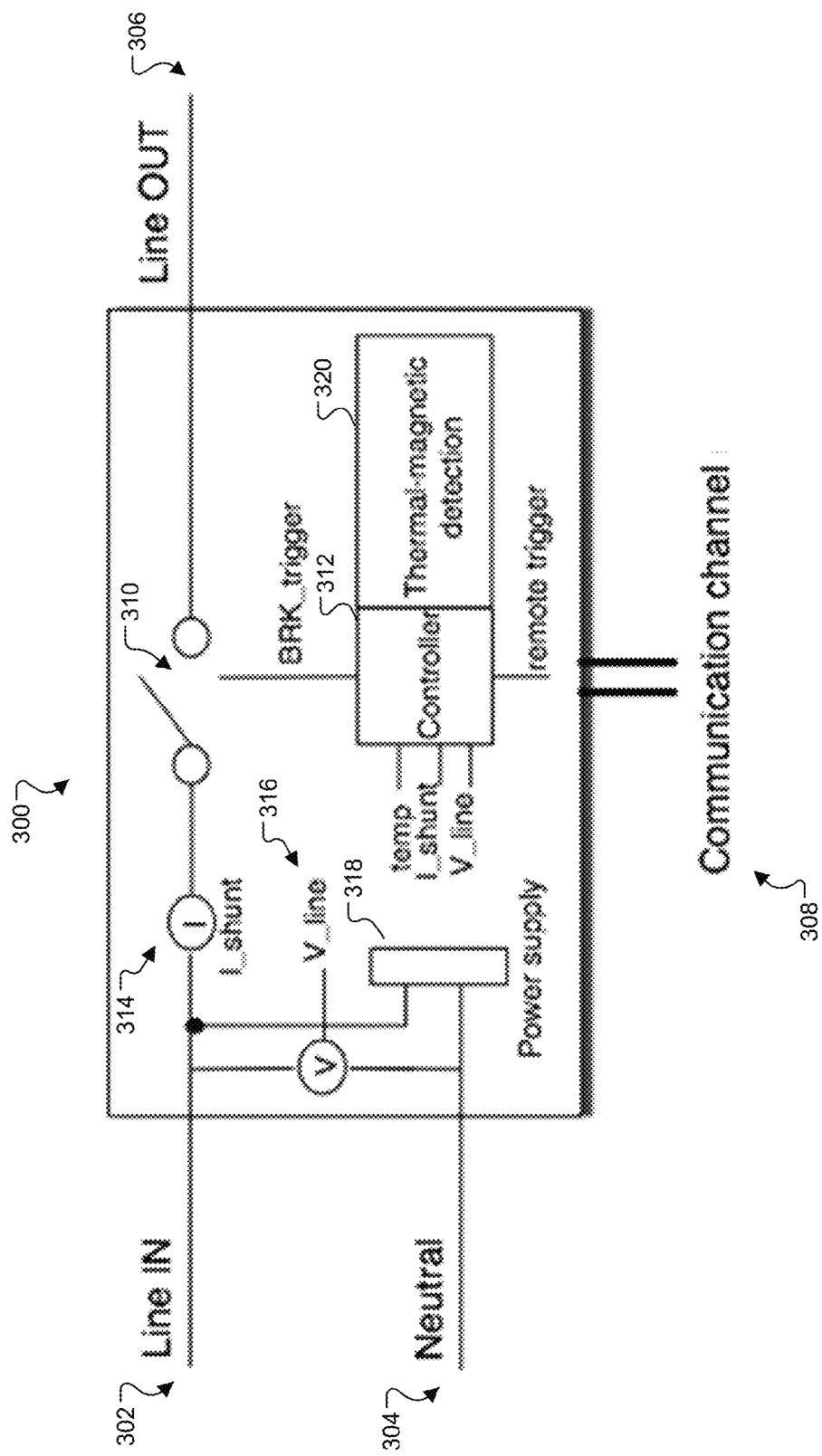
FIG. 3B is a block diagram of the example mechanical circuit breaker with a thermal-magnetic detection unit.

FIG. 3B is a block diagram of the example mechanical circuit breaker 300 with a thermal-magnetic detection unit 320. The circuit breaker can use thermal-magnetic detection to trip the switch, in additional to implementing AFCI, GFCI, and remote operation.

Figure 4A:
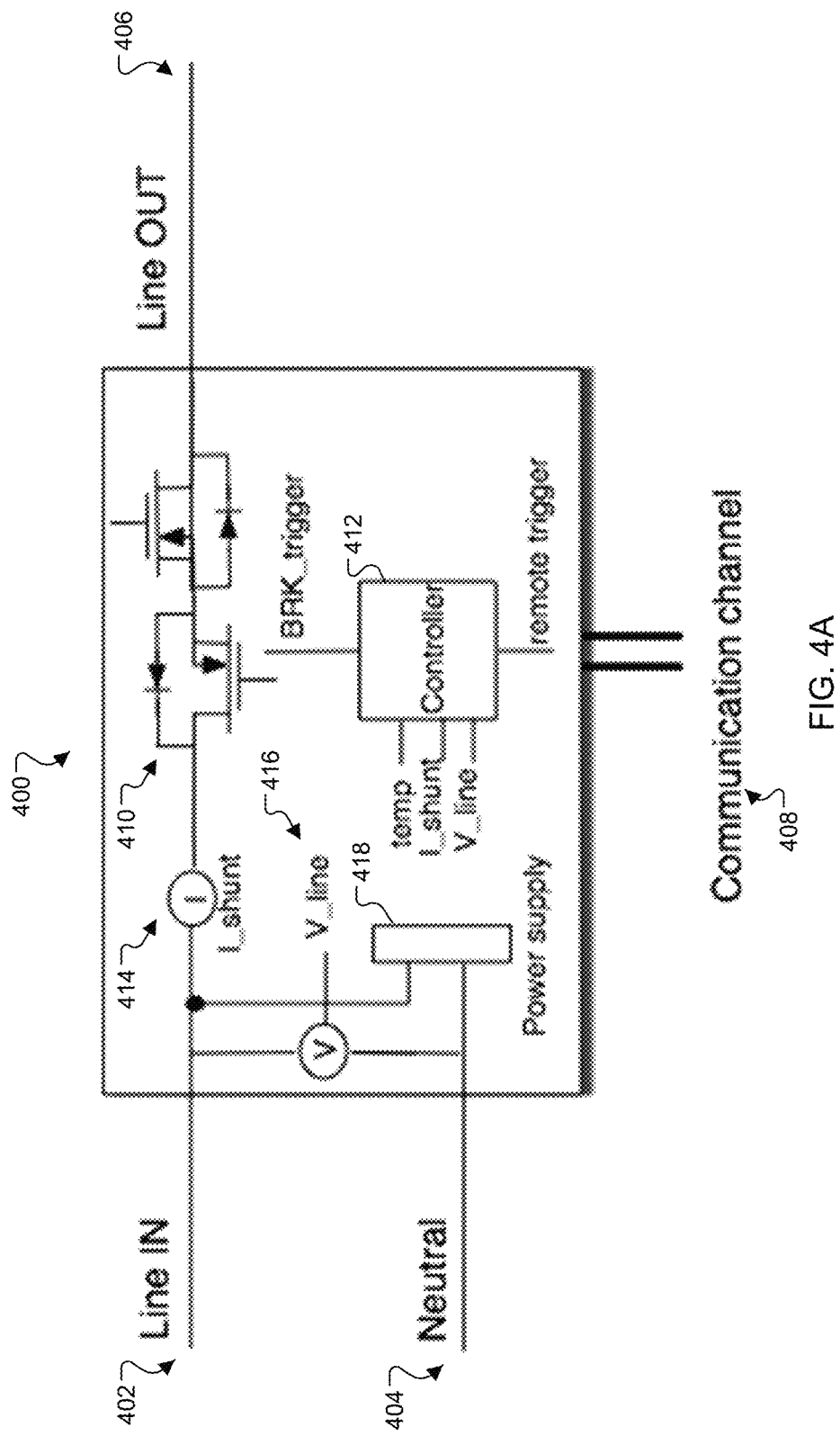
FIG. 4A is a block diagram of an example semiconductor circuit breaker.

FIG. 4A is a block diagram of an example semiconductor circuit breaker 400. The circuit breaker includes inputs for a Line IN 402 and Neutral 404 and an output for a Line OUT 406. The circuit breaker is also connected to a data communications channel 408, e.g., by a wired or wireless communications device. The circuit breaker includes a controller 412, a current measuring device 414, a voltage measuring device 416, and a power supply 418.

The circuit breaker 400 of FIG. 4A differs from the circuit breaker 300 of FIG. 3A in that the switch 410 is implemented in semiconductor technology. Using semiconductor actuation can enable faster isolation of the downstream circuit branch, thereby improving safety.

Figure 4B:
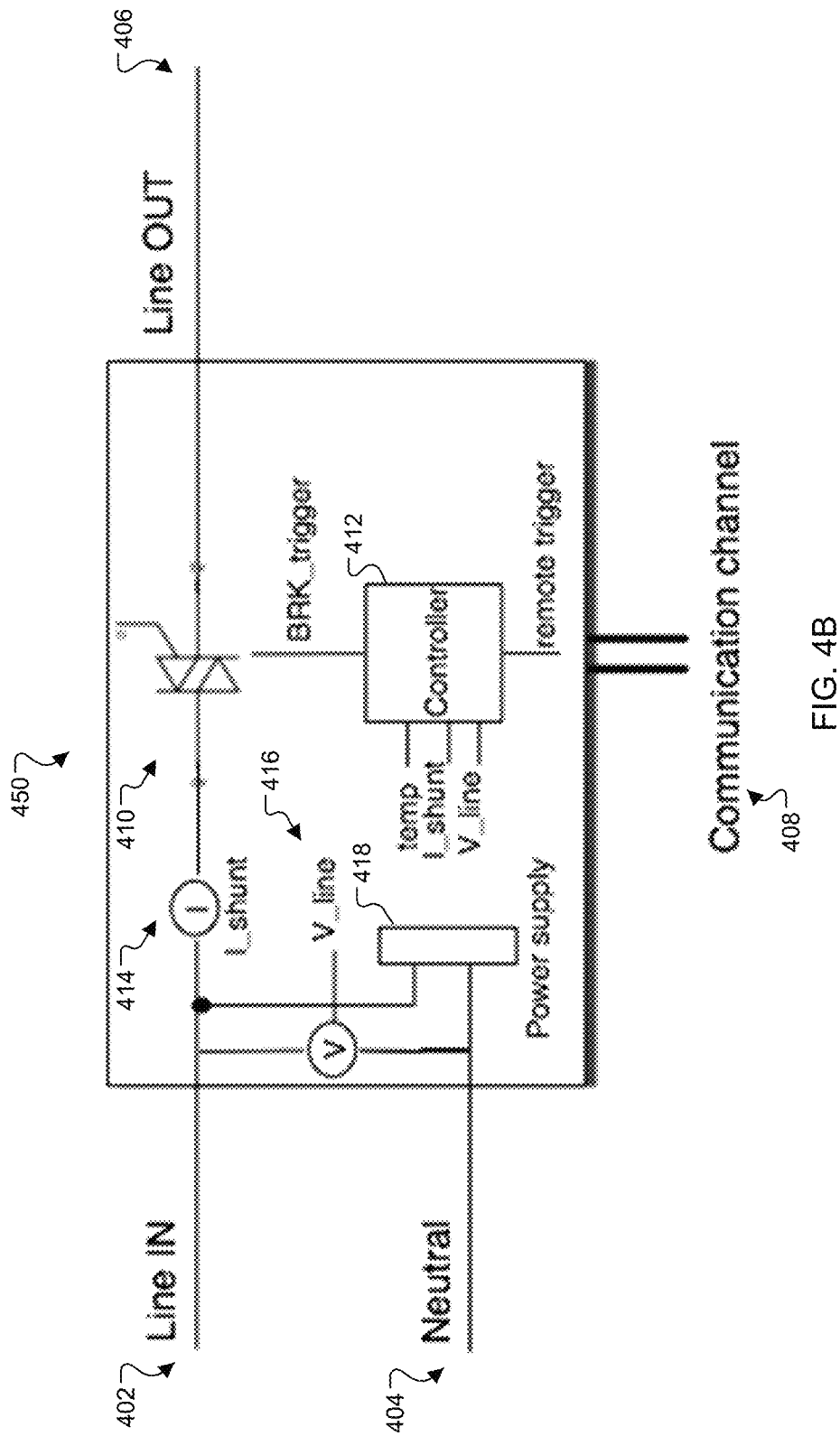
FIG. 4B is a block diagram of an example semiconductor circuit breaker.

FIG. 4B is a block diagram of an example semiconductor circuit breaker 450. The switch 410 in this example circuit breaker is implemented as an AC switch, e.g., a triode for alternating current (TRIAC).

Figure 5A:
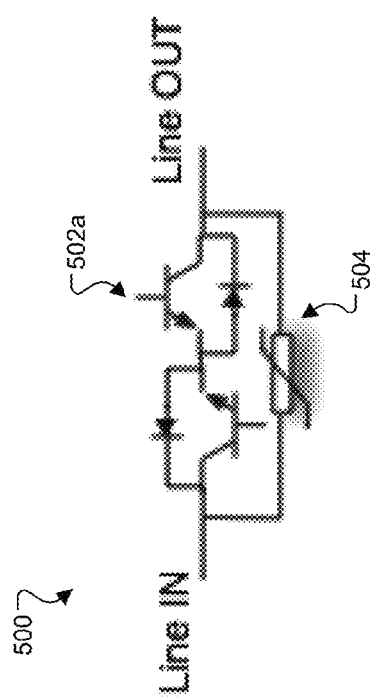
FIG. 5A is a block diagram of an example semiconductor circuit breaker.

FIG. 5A is a block diagram of an example semiconductor circuit breaker 500. The semiconductor circuit breaker can be used as the switch 410 of FIG. 4, for example. The breaker includes a semiconductor switch 502a connected in parallel with a dissipative element 504, e.g., a metal oxide varistor (MOV) or other type of varistor. The dissipative element acts as an arc extinguisher, e.g., an arc chute. The semiconductor switch 502a is an alternating current (AC) switch that can conduct current and block voltage for the positive and negative half-cycles of a sine wave. In some implementations the breaker includes a semiconductor switch 502a connected in series with the dissipative element 504.

The semiconductor switch 502a is implemented as two transistors, e.g., insulated gate bipolar transistors (IGBTs), with a common emitter connection. This implementation can be useful, e.g., to reduce conduction/on-state losses and the size of the device. Reducing switching frequency, and therefore switching losses, may be less important in circuit breaker than in other applications because the breaker does not switch continuously.

The transistors can alternatively be metal oxide semiconductor field effect transistors (MOSFETs), integrated gate-commutated thyristors (IGCT), micro-electro-mechanical systems (MEMS), or bidirectional triode thyristors. The transistors can be SiC or GaN devices.

Figure 5B:
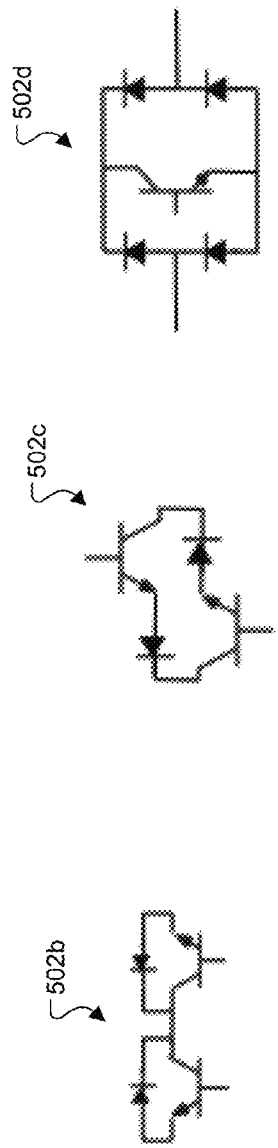
FIG. 5B illustrates three alternative semiconductor switches.

FIG. 5B illustrates three alternative semiconductor switches 502b-d. The first alternative 502b includes two IGBTs and two diodes with a common collector connection. The second alternative 502c includes two IGBTs and two diodes with an emitter-collector connection. The third alternative 502d includes an anti-parallel network of diodes around a transistor.

Figure 6A:
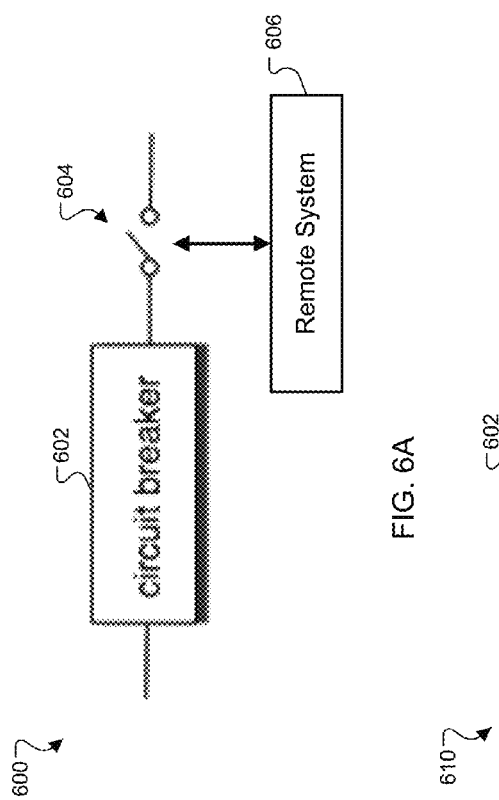
FIG. 6A is a block diagram an example circuit breaker system that has a conventional circuit breaker connected in series with an additional switch.

FIG. 6A is a block diagram an example circuit breaker system 600 that has a conventional circuit breaker 602 connected in series with an additional switch 604. In this system, the conventional circuit breaker can perform traditional circuit breaking functions, e.g., short-circuit protection, and the additional switch can add further functionality.

For example, the additional switch can be connected to a data communications network and can receive instructions to open and close the additional switch, e.g., for load curtailment. The additional switch can perform monitoring functions, e.g., monitoring the current through the circuit breaker and reporting the current on the data communications network.

In some implementations, the additional switch communicates with a remote system 606. The remote system 606 can be, e.g., a resident's user device, or a server of one or more computers on the Internet. The remote system can send instructions to the switch and receive measured values characterizing the power consumption of a downstream circuit from the switch.

Figure 6B:
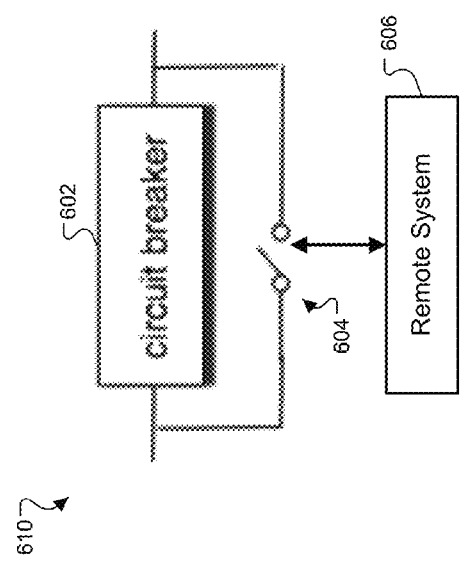
FIG. 6B is a block diagram of an alternative circuit breaker system where the conventional circuit breaker is connected in parallel with the additional switch.

FIG. 6B is a block diagram of an alternative circuit breaker system 610 where the conventional circuit breaker is connected in parallel with the additional switch. This system may be useful, e.g., where it would be useful to remotely energize a downstream circuit after the conventional circuit breaker has tripped and requires someone to manually reset it. For example, the remote system 606 can determine that the fault has been cleared and send an instruction to the additional switch 604 to re-energize the downstream circuit.

Figure 7A:
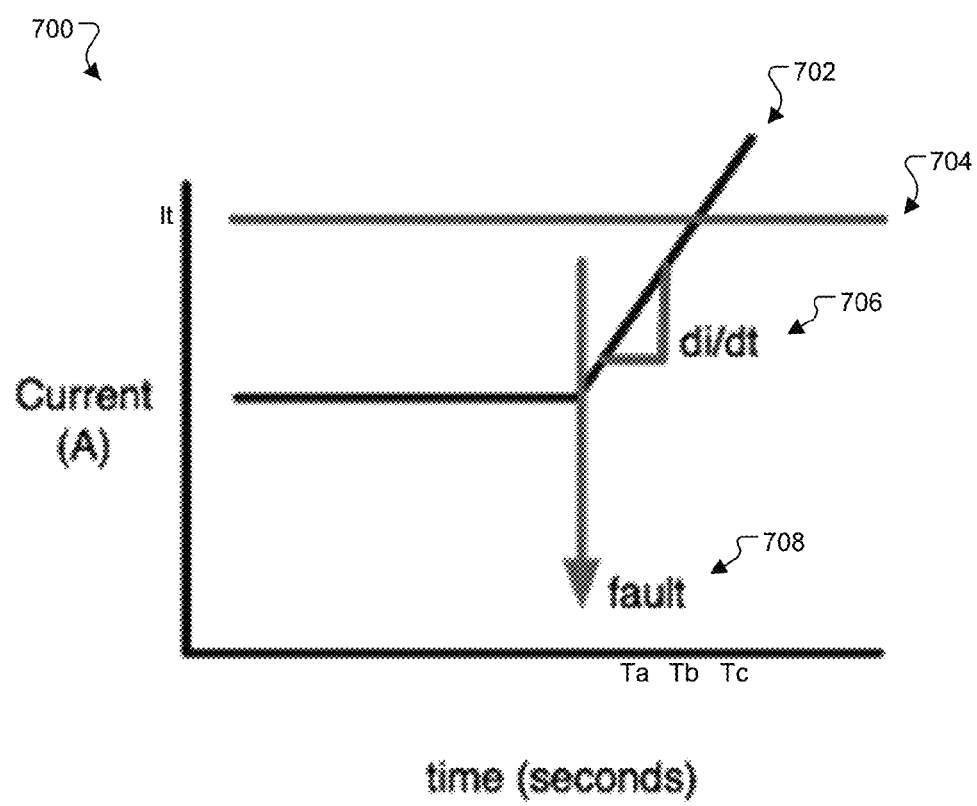
FIG. 7A is a current diagram illustrating the current in a downstream branch circuit over an example period of time.

FIG. 7A is a current diagram 700 illustrating the current in a downstream branch circuit over an example period of time. A first curve 702 illustrates the current in the circuit. The current is substantially constant until a fault 708 occurs, and then the current begins rising at a constant rate. When the current rises at a high, substantially constant rate over a short time period, e.g., hundreds of microseconds, this indicates a bolted fault.

A circuit breaker with electronic trip detection and/or actuation that is configured to trip when the current reaches a constant threshold current, illustrated by a second curve 704, will eventually trip, at time Ta, and de-energize the circuit having the bolted fault. A circuit breaker configured to trip when the rate of change of the current over time 706, di/dt, exceeds a threshold rate can trip even earlier, at time Tb, and this can be useful for safety reasons because the circuit be de-energized sooner.

The circuit breaker can also use a certain amount of time in determining whether to trip. For example, the circuit breaker can trip only when di/dt exceeds the threshold for at least the certain amount of time, e.g., the difference between Ta and Tb as shown in FIG. 7A. The amount of time can be in the range of 100 s of microseconds. This is useful in filtering out noise or other routine variations in di/dt that do not indicate a bolted fault and could otherwise cause the circuit breaker to trip prematurely. This can also be useful in distinguishing a bolted fault from in-rush current caused by a load starting to draw power. In-rush current, in some cases, can cause a high di/dt for a period of a few AC cycles, e.g., 10 s of milliseocnds.

The circuit breakers of FIG. 3 and FIG. 4 can be configured to detect bolted faults by configuring the controllers 312 and 314 to measure the current, determine the rate of change over time, and compare the rate of change over time to a threshold rate of change over time. Alternatively, a circuit breaker can be configured to detect bolted faults using an analog circuit.

Figure 7B:
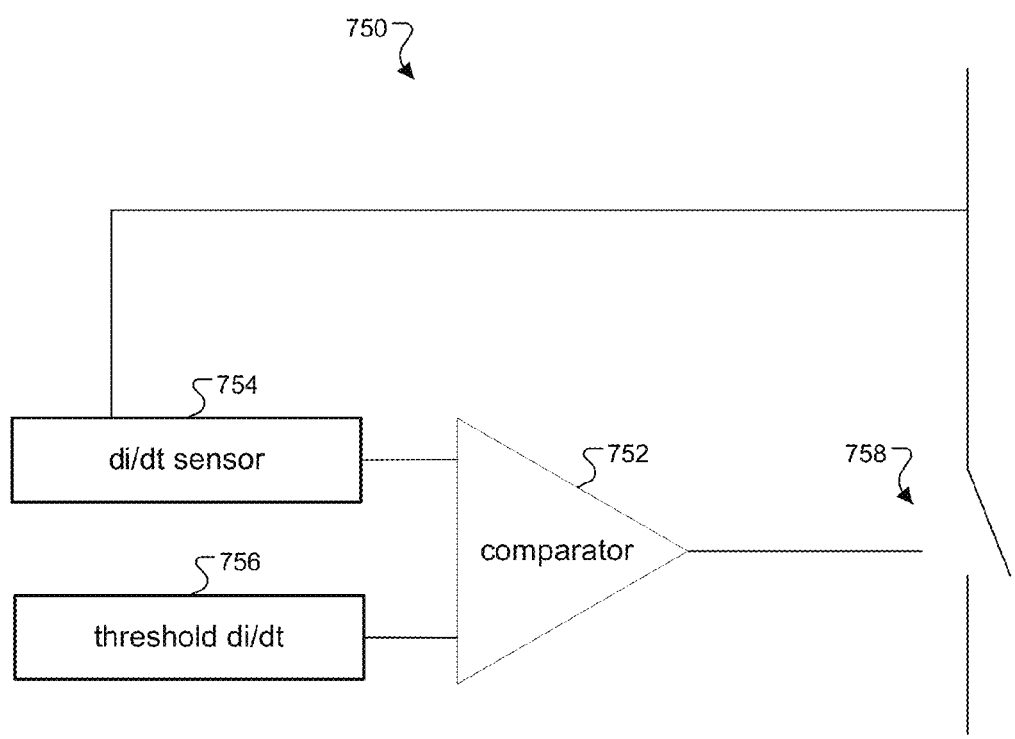
FIG. 7B is a block diagram of an example analog circuit for detecting bolted faults.

FIG. 7B is a block diagram of an example analog circuit 750 for detecting bolted faults. The circuit includes a comparator 752, a di/dt sensor 754, and a source of a threshold di/dt value 756. When the di/dt measured by the sensor exceeds the threshold di/dt, the output of the comparator changes and causes a switch 758 to open, thereby breaking the circuit. The di/dt sensor can be any appropriate sensor for measuring the rate of change of current over time, e.g., a di/dt sensor based on an air coil around a long straight wire.

Figure 8:
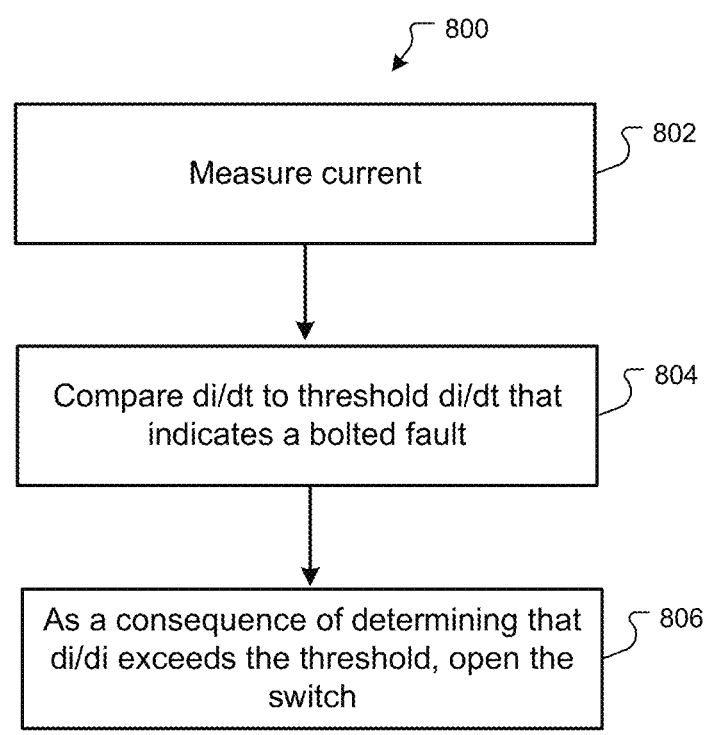
FIG. 8 is a flow diagram of an example process for tripping a circuit breaker by detecting a bolted fault.

FIG. 8 is a flow diagram of an example process 800 for tripping a circuit breaker by detecting a bolted fault. The circuit breaker includes an input and an output and a switch coupled between the input and output.

The circuit breaker measures the current flowing from the input to the output (802). The circuit breaker compares a rate of change of the current to a threshold rate of change of current that indicates a bolted fault on a circuit downstream from the circuit breaker (804). As a consequence of determining that the rate of change of the current measured by the sensor matches or exceeds the threshold rate of change of current, the circuit breaker opens the switch, thereby disconnecting the input from the output (806).

Figure 9:
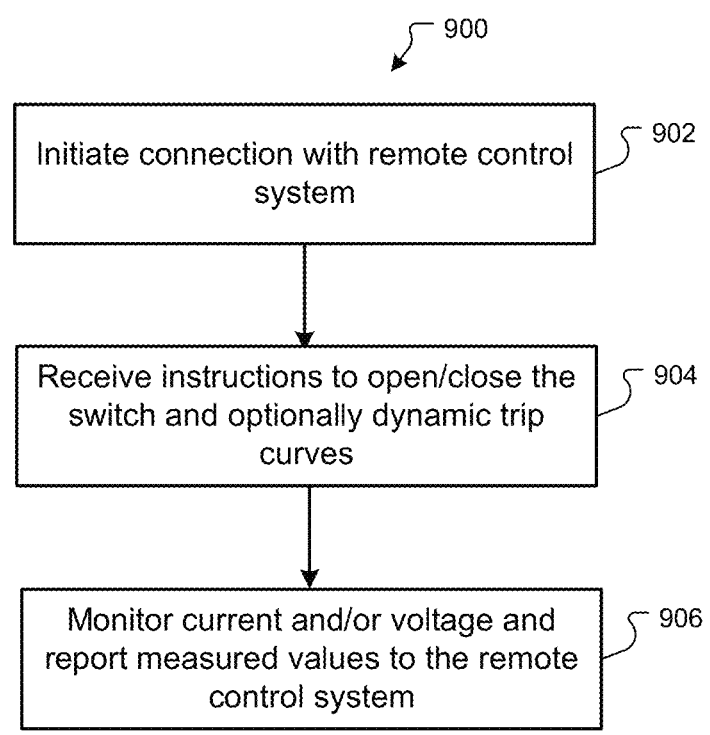
FIG. 9 is a flow diagram of an example process for performing remote control and monitoring in a circuit breaker.

FIG. 9 is a flow diagram of an example process 900 for performing remote control and monitoring in a circuit breaker. The circuit breaker includes an input and an output and a switch coupled between the input and output.

The circuit breaker initiates a connection with a remote control system (902). The remote control system can be, e.g., a computer system in a residence or a server of one or more computers on a network. For example, the remote control system can be run by a utility company or a third party providing control services for residences. The connection is a data communications connection over a data communications network, e.g., the Internet. In some implementations, the circuit breaker has a unique identifier on the network, e.g., an internet protocol (IP) address. In some implementations, the circuit breaker authenticates to the remote control system.

The circuit breaker receives instructions from the remote control system to open and close the switch (904). The circuit breaker optionally receives other information, e.g., dynamic trip curves. The circuit breaker opens and closes the switch according to the instructions. The instructions may be, e.g., intended for load curtailment or safety or for other reasons. The system monitors at least one of measured current or voltage at the switch and reports the measured values to the remote control system (906).

The processes and logic flows described in this specification can be performed by one or more programmable devices programmed to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A circuit breaker comprising:
    an input and an output;
    a switch coupled between the input and output;
    a communications device configured to communicate on a data communications network; and
    a control system coupled to the switch and the communications device, wherein the control system comprises a microcontroller and a non-transitory computer storage medium that cause the circuit breaker to perform operations comprising:
    receiving data specifying a dynamic trip curve specifying a plurality of trip conditions, each trip condition corresponding to a particular time period during a day, wherein at least two time periods are specified and the trip conditions for each time period are different from each other;
    adjusting, based on loads monitored by the control system that are connected downstream of the circuit breaker, the dynamic trip curve;
    opening the switch as a consequence of detecting an overcurrent condition in a circuit downstream from the circuit breaker, the detection of the overcurrent condition dependent on the time of day and the corresponding dynamic trip condition specified by the dynamic trip curve that corresponds to the particular time period that is inclusive of the time of day and that has been adjusted based on the loads monitored by the control system;
    opening and closing the switch based on one or more instructions received by the communications device from the data communications network; and
    monitoring the power consumption of the circuit downstream from the circuit breaker.

2. The circuit breaker of claim 1, wherein the control system comprises a microcontroller and software, firmware, hardware, or a combination of them that in operation cause the microcontroller to perform the operations.

3. The circuit breaker of claim 1, the operations comprising detecting an arc fault in the circuit downstream from the circuit breaker and, as a consequence of detecting the arc fault, opening the switch, thereby disconnecting the input from the output.

4. The circuit breaker of claim 1, the operations comprising detecting a ground fault in the circuit downstream from the circuit breaker at a threshold suitable for personal safety and, as a consequence of detecting the ground fault, opening the switch, thereby disconnecting the input from the output.

5. The circuit breaker of claim 1, the operations comprising reporting the monitored power consumption over the data communications network using the communications device.

6. The circuit breaker of claim 1, the operations comprising storing the monitored power consumption on a computer storage medium coupled to the control system.

7. The circuit breaker of claim 1, wherein the circuit breaker is configured to automatically reclose the switch as a consequence of determining that a fault has been cleared.

8. The circuit breaker of claim 1, wherein the switch comprises a semiconductor device in parallel with an energy dissipating element.

9. The circuit breaker of claim 1, the operations comprising executing an acoustic and/or visual alert mechanism as a consequence of opening the switch.

10. A method performed by a circuit breaker comprising an input and an output and a switch coupled between the input and output, the method comprising:
    initiating a connection with a remote control system over a data communications network;
    receiving a plurality of instructions from the remote control system and, in response, opening and closing the switch based on the one or more instructions, comprising:
    receiving data specifying a dynamic trip curve specifying a plurality of trip conditions, each trip condition corresponding to a particular time period during a day, wherein at least two time periods are specified and the trip conditions for each time period are different from each other;
    adjusting, based on loads monitored by the circuit breaker that are connected downstream of the circuit breaker, the dynamic trip curve;
    opening the switch as a consequence of detecting an overcurrent condition in a circuit downstream from the circuit breaker, the detection of the overcurrent condition dependent on the time of day and the corresponding dynamic trip condition specified by the dynamic trip curve that corresponds to the particular time period that is inclusive of the time of day and that has been adjusted based on the loads monitored by the circuit breaker;
    measuring a value characterizing the power consumption of a circuit downstream from the circuit breaker; and
    reporting the measured value to the remote control system.

11. The method of claim 10, wherein the circuit breaker comprises a microcontroller and software, firmware, hardware, or a combination of them that in operation cause the microcontroller to perform the method.

12. The method of claim 10, comprising detecting an arc fault in the circuit downstream from the circuit breaker and, as a consequence of detecting the arc fault, opening the switch, thereby disconnecting the input from the output.

13. The method of claim 10, comprising detecting a ground fault in the circuit downstream from the circuit breaker at a threshold suitable for personal safety and, as a consequence of detecting the ground fault, opening the switch, thereby disconnecting the input from the output.

14. The method of claim 10, wherein initiating the connection with the remote control system comprises authenticating to the remote control system.

15. The method of claim 10, comprising storing the measured value on a computer storage medium.

16. The method of claim 10, comprising automatically reclosing the switch as a consequence of determining that a fault has been cleared.

17. The method of claim 10, wherein the switch comprises a semiconductor device in parallel with an energy dissipating element.

18. The method of claim 10, comprising executing an acoustic and/or visual alert mechanism as a consequence of opening the switch.

* * * * *